3,651,064
PROCESS FOR PREPARING TERTIARY AMINE ALANES
Gunner E. Nelson, Warren E. Becker, and Paul Kobetz, Baton Rouge, La., assignors to Ethyl Corporation, New York, N.Y.
No Drawing. Original application Oct. 23, 1967, Ser. No. 677,088. Divided and this application Jan. 12, 1970, Ser. No. 2,392
Int. Cl. C07d *105/00;* C07f *5/06*
U.S. Cl. 260—270 R      17 Claims

---

ABSTRACT OF THE DISCLOSURE

A process for preparing tertiary amine alanes by direct synthesis from hydrogen, an aluminum source, and a tertiary mono amine in the presence of a reaction promoter.

---

CROSS-REFERENCE TO RELATED APPLICATION

This is a division of application Ser. No. 677,088 filed Oct. 23, 1967, now Pat. No. 3,535,107.

BACKGROUND OF THE INVENTION

Field of the invention

This invention relates to the synthesis of tertiary amine alanes directly from aluminum, hydrogen and tertiary mono amines. These alanes may be utilized in the chemical refining of metallic aluminum. In addition to their use as intermediates in the refining of aluminum, tertiary amine alanes also find use in plating aluminum and as reducing agents.

Description of the prior art

Heretofore various methods have been described for the synthesis of tertiary amine alanes, that is, complexes between tertiary amines and aluminum hydride. For example, Wiberg, Graf and Uson, Zeitschrift fur Anorganische und Allgemeine Chemie, 272, 221–232 (1953), disclose the direct reaction between trialkyl amines and aluminum hydride in ether solutions. However, in order to practice the Wiberg et al. procedure, it is necessary to utilize complicated or expensive procedures for the synthesis of the aluminum hydride. More particularly, as noted by Ziegler and Gellert (U.S. 3,032,574) aluminum hydride cannot be produced by a simple addition reaction between aluminum and hydrogen. Thus, Wiberg et al. synthesized the aluminum hydride in ether solution by reaction between lithium aluminum hydride and aluminum chloride. Another way of preparing aluminum hydride in ether solution involves reaction between the correct proportions of an alkali metal hydride or an alkaline earth metal hydride and aluminum chloride. See Bragdon U.S. 2,680,059.

Another method for preparing tertiary amine alanes is that reported by Ruff and Hawthorne, J. Am. Chem. Soc., 82, 2141 (1960) which involves reacting lithium aluminum hydride with trimethyl amine hydrochloride in ether.

More recently, Brendel, Kobetz and Whaley (U.S. 3,326,955) describe a process for the preparation of tertiary amine alanes which involves effecting reaction under appropriate conditions among alkali metal hydride, an aluminum trihalide, and a trialkyl amine, catalytic amount of an alkyl aluminum compound being utilized.

It will be noted that none of the foregoing methods is capable of preparing tertiary amine alanes directly from aluminum, hydrogen, and tertiary mono amines. So far as is known, the only successful syntheses of tertiary amine alanes directly from the elements (so to speak) are those reported by Ashby (U.S. 3,159,626); copending application S.N. 334,900 filed Dec. 31, 1963; and J. Am. Chem. Soc. 86, 1882–3 (1964). In the Ashby processes, triethylene diamine or tetramethylethylene diamine, both of which are tertiary diamines, are reacted with aluminum and hydrogen under appropriate reaction conditions to form tertiary amine alane products. When triethylene diamine is employed, the product which is formed $[N(C_2H_4)_3N \cdot AlH_3]$ is a solid which is insoluble in hydrocarbons, ethers and other common organic media. Moreover, this product is thermally stable up to temperatures of over 200° C. and thus to liberate aluminum from this compound by thermal decomposition requires relatively high temperatures. When tetramethylethylene diamine is used in the Ashby procedure, the reaction tends to be quite slow and yields various complexes in which the content of active hydrogen corresponds to a H:Al ratio of about 1.2:1 or less.

Unfortunately, attempts to apply the Ashby discoveries to tertiary mono amines rather than tertiary diamines have heretofore been unsuccessful, as witness the fact that trialkylamines can be used as inert solvents for the reaction among aluminum, hydrogen and triethylene diamine (note U.S. 3,159,626, col. 2, lines 3–9). In fact, the reaction among tertiary amines, aluminum, and hydrogen does not proceed with any perceptible rate even when utilizing activated aluminum.

SUMMARY OF THE INVENTION

It has now been discovered that the reaction among tertiary amines, aluminum and hydrogen can be readily conducted under relatively mild conditions provided certain reaction-promoting catalysts are utilized.

Accordingly, the principal object of this invention is to provide a process for the synthesis of tertiary amine alanes directly from aluminum, hydrogen and tertiary mono amines.

A further object of the present invention is to provide a tertiary amine alane which may be utilized in the production of metallic aluminum.

Other objects, features, advantages, and characteristics of this invention will become still further apparent from the ensuing description and appended claims.

DESCRIPTION OF THE PREFERRED EMBODIMENT

The preferred embodiment of this invention is characterized by the preparation of tertiary amine alanes by a catalyzed reaction between metallic aluminum, hydrogen and a tertiary mono amine.

In accordance with this embodiment of the invention, tertiary amine alanes are prepared in an anhydrous system by reacting together metallic aluminum, hydrogen and a tertiary mono amine in the presence of at least one reaction-promoting element selected from Group IV–B or Group V–B as set forth in the Periodic Chart of the Elements published by Fisher Scientific Company. Thus, titanium, vanadium, zirconium, hafnium, niobium, and tantalum may be used either individually or in combination as catalysts, and of these, titanium and vanadium are preferred, titanium being the most preferred reaction promoter in the alane synthesis. Since it has been found that this process requires the presence of a reaction promoter to synthesize the alanes, in a preferred feature of this invention, titanium is introduced into the system in the form of a titanium-containing aluminum alloy. (The term "metallic" as applied to aluminum in this specification and in the claims is intended to denote the metal per se or alloyed with other metals, as distinguished from intermetallic aluminum.)

Since titanium is frequently found to naturally occur in various aluminum alloys, it is significant that utilization of such an alloy as the source of metallic aluminum eliminates the need for further addition of titanium or other catalyst to the system. It is also significant that the aluminum alloy may contain impurities ordinarily found in aluminum source materials in addition to titanium without retarding the effectiveness of the titanium in promoting the alane synthesis reaction. For example, an alloy containing titanium and appreciable quantities of iron and silicon has been used successfully in practicing the invention. Typically, the alloy may be present in the system in the form of a carbothermic aluminum alloy having approximately the following composition by weight:

|  | Percent |
|---|---|
| Aluminum | 60 |
| Silicon | 35 |
| Iron | 3 |
| Titanium | 2 |

While these composition percentages are not critical, the aluminum content should preferably be at least 40 percent, and substantially any alloy, or metallic scrap aluminum source, having at least this aluminum content will provide a suitable starting material for the invention regardless of the presence of impurities such as, or in addition to, those noted above.

In a typical aluminum alloy source the silicon content may range from about 5 to about 50 percent and the iron from about 0.1 to about 10 percent by weight of the alloy. It is preferable to realize a low alloy iron content to avoid the formation of an iron-aluminum intermetallic which does not react in the hydroalumination phase of the process.

In order to practice the present invention with best advantage it has been found that the aluminum should be introduced into the reaction system in subdivided form to facilitate maximum surface area for interaction of the reactants. Size reduction may easily be accomplished by such processes as flaking, granulating, milling, or by any other conventional method known to those skilled in the art. While the actual particle size of the aluminum reactant is not critical, in a preferred feature of the invention the aluminum is subdivided and capable of passing through a 325 mesh screen.

The amine synthesis invention is further characterized by a feature of catalyst utilization which provides that the reaction promoter may be introduced into the system by means of a suitable catalyst-containing compound. Typically, titanium has been effectively added to the reaction system as a titanium ester and vanadium has been used successfully as a reaction promoter when introduced as a vanadium salt.

In addition to the discovery that a catalyst is necessary in the amine synthesis process, it has further been determined that the metallic aluminum should be activated in order for the reaction to proceed most expeditiously. Such activation may be accomplished by application of a variety of techniques, one of which is the addition of certain activating components which will be hereinafter further identified. Thus, the use of activated aluminum, especially in subdivided form, is a preferred embodiment of this invention.

In addition to the advantageous features characterized by application of a "built in" catalyst system in the form of a reaction promoter-containing aluminum alloy or readily available catalyst-containing compounds, or both, the amine alane synthesis invention is further advantageous in that it is capable of being practiced under mild reaction conditions. For example, the reaction may easily be carried out at a temperature ranging from about 50° C. to about 200° C., and as illustrated in the examples, reaction at this relatively low temperature gives excellent results. A preferable synthesis temperature for the amine alane is from about 60° C. to about 100° C. and a most preferable temperature range for carrying out this reaction is from about 70° C. to about 90° C.

System pressure is subject to wide variation and may range from 50 to 15,000 p.s.i.g. or higher, although according to a preferred feature of the invention the hydrogen pressure range found to be more preferable was from about 500 to about 5000 p.s.i.g.; the pressure should be most preferably adjusted to a range of from about 500 to about 3000 p.s.i. during the reaction period. Practice of the invention utilizing temperatures and pressures falling within the above ranges resulted in the formation of tertiary amine alane in good yield.

As heretofore noted, in a preferred feature of the alane synthesis, reaction-promoting titanium is introduced into the system as a constituent of the metallic aluminum itself or it may exist simply as an impurity associated with the aluminum source material. Tests have shown that when the alloy is used as the titanium source in the invention the titanium content of this alloy may effectively exist in quantities ranging from about 0.001 to about 10 percent and should preferably be present in quantities within the range from about 0.01 to about 5 percent by weight of the alloy, although the upper limit of the titanium content appears not to be critical. The titanium content should most preferably be from about 0.02 to about 2 percent of the weight of the aluminum alloy.

As additionally heretofore noted, the reaction promoter may be introduced into the system independently of the aluminum source material by use of a catalyst-containing compound such as an ester or a halide salt of a Group IV-B or V-B metal as set forth in the Fisher Periodic Chart. Thus, effective use may be made of titanium-containing compounds such as titanium esters having from 1 to about 12 carbon atoms, titanium halides and vanadium halides, as well as esters and halide salts of other Group IV-B and V-B metals. Typical of the metal esters which may be used with good results in the alane synthesis are titanium methoxide, hafnium butoxide, zirconium isopentoxide, niobium decoxide and tantalum dodecoxide. Preferred metal halides are titanium trichloride, titanium tetrabromide, titanium diiodide, vanadium trichloride, zirconium tetrachloride and tantalum tribromide. Most preferred catalysts in the alane synthesis stage of the invention are titanium isopropoxide, vanadium tetrachloride and titanium tetrachloride.

When utilizing these catalyst-containing compounds, the aluminum subjected to the reaction may range from impure or scrap aluminum alloys, and the like up to pure aluminum itself, such as primary aluminum.

Although the enumerated reaction promoters represent preferred catalysts for use in the invention, it will be apparent to those skilled in the art that substantially any compound or compounds containing at least one of the metals found in Group IV-B and V-B may be used to successfully promote the alane synthesis reaction. It should be noted that the reaction promoters may be effectively utilized alone or in combination, and the catalyst-containing compound may be used in the process whether the metallic aluminum source contains a reaction promoter or not. The concentration of the selected compound added to the system does not appear to be critical since trace amounts have been found sufficient to promote the reaction even where no catalyst is present in the aluminum reactant.

A further preferred feature of the invention involves reacting the metallic aluminum and tertiary mono amine with hydrogen in an anhydrous system where a relatively inert solvent is added to dissolve the amine and the amine alane product. Anhydrous conditions are preferred to insure that the alane will not decompose and release active hydrogen bound therein. Suitable solvents for effective use in the invention are aromatic hydrocarbons (substituted and unsubstituted), cyclic and polycyclic ethers, and amines (preferably tertiary mono amines). Preferable solvents are benzene, toluene, diphenyl ether, tributylamine and trimethylamine. Most preferred solvents for use in the process are benzene and trimethylamine.

The above enumerated solvents are intended to be illustrative and not limiting in the invention since it has been found that substantially any solvent which is relatively inert can be used with satisfactory results.

While synthesizing amine alanes according to the present invention it has been determined that the amine reactant utilized in the process should be a tertiary mono amine. Thus, effective use may be made of tertiary mono amines where the groups attached to the nitrogen atom are alkyl, aryl, aralkyl, heterocyclic and the like. Usually such trihydrocarbon amines or heterocyclic mono amines will contain a total of up to about 30 carbon atoms in the molecule. The tertiary mono amine so characterized may be typically tributylamine, methylethyl-i-propylamine, benzyldiethylamine, dibenzyl-propylamine, tricyclohexylamine, tribenzylamine, tris-(4-pyridyl)amine, and ethyl bis-(4-pyridyl)amine, but is preferably a trialkylamine, and most preferably a trialkylamine having from 1–4 carbon atoms in each alkyl group.

In a preferred feature of the invention trimethylamine is reacted in a benzene solvent, and in a most preferred feature of the amine synthesis phase of the process, trimethylamine is used as the tertiary mono amine in the reaction and an excess of this amine as the reaction solvent. As previously noted, where the reaction is carried out in the above mentioned and other relatively inert solvents, the tertiary mono amine as well as the amine alane product should be soluble in the solvent medium in order to facilitate separation of the amine alane from solids in the reaction system according to the described feature of the second embodiment of the invention disclosed in said application Ser. No. 677,088, said application being incorporated herein in toto. However, if desired, the process may be carried out in the absence of a solvent. Where no solvent is used in the reaction the solids may be removed by sublimation or by selectively extracting the amine alane product from the solids by any conventional leaching operation, the techniques of which are well known to those skilled in the art.

As heretofore noted, the aluminum in the system should be activated in order for the reaction to take place most expeditiously. Accordingly, another preferred feature of the amine synthesis invention is the reaction of metallic aluminum, a tertiary mono amine, and hydrogen in an anhydrous system containing an inert solvent and in the presence of an aluminum activator. Among the satisfactory activators and promoters which may be used to activate the metallic aluminum are aluminum hydrocarbon compounds, notably of alkyl aluminum composition, the most preferred of which is triethylaluminum. It has been found that presence of this compound in trace amounts will satisfactorily promote the reaction; however, the triethylaluminum should preferably be present in quantities up to about 5 percent based on the weight of the reactants in the amine synthesis stage of the process.

Further, in addition to or in the place of aluminum hydrocarbon compounds, such materials as alkali metals, alkali metal hydrides and dialkylaluminum alkoxides, notably diethylaluminum ethoxide, may be used as aluminum activating agents in the invention. The most preferable component of this latter group is sodium metal or sodium hydride, and in a most preferred combination, sodium metal is used with triethylaluminum as the aluminum activating system.

It has been found that the activators may be used individually or in combination, whether the reaction promoter or promoters are introduced into the system as a constituent of the aluminum alloy or by means of a catalyst-containing compound, and whether a solvent is used or not. It should be noted that in lieu of the novel activation technique presented in the invention, the metallic aluminum may be activated before being placed in the reaction system by methods known to those skilled in the art. Moreover, catalytic quantities of the activators have been used with good success in practicing the invention. In short, the use of activated aluminum is preferred.

Reaction conditions, methods of introducing reactants and operating techniques, as well as the benefits and advantages of the invention will be more readily understood by reference to the following examples which are merely illustrative and are not intended to limit the scope of the invention.

EXAMPLE I

In preparing trimethylamine alane, 14 grams of carbothermic aluminum alloy (previously sieved to pass a 325 mesh screen) containing approximately 68 percent aluminum, 27 percent silicon, 3 percent iron and 2 percent titanium was charged with 3 milliliters of triethylaluminum, 50 milliliters of benzene solvent and 0.5 gram of sodium metal into a 300 milliliter Magne-Stir autoclave, using a nitrogen box to avoid oxygen contamination. One hundred and eleven milliliters of trimethylamine was measured volumetrically as a liquid at —80° C. and distilled into the autoclave. The autoclave was then pressured to 4000 p.s.i.g. with hydrogen, the contents were heated to 80° C. and mixing was accomplished by baffled stirring. After an induction period of several hours the pressure began to drop and when it leveled off, the autoclave was cooled, vented, and opened in the dry box. The contents were filtered and the clear, colorless trimethylamine alane filtrate was decomposed to yield aluminum, hydrogen, and trimethylamine.

EXAMPLE II

The preparation of trimethylamine alane is repeated as in Example I, 0.01 milliliter $TiCl_4$ being added to the benzene-trimethyl amine alane solution and this solution is heated to the boiling point of the benzene.

EXAMPLE III

Equipment used in this experiment was the same as that noted in Example I with the exception that no baffle was used in the stirring on this run. Seven grams of aluminum metal (sieved to pass a 325 mesh screen and containing no titanium) was charged into the autoclave with 3 milliliters of triethylaluminum, 50 milliliters of benzene, 0.5 gram of sodium metal and 1 milliliter of titanium isopropoxide. One hundred and eleven milliliters of trimethylamine was distilled into the autoclave, which was then pressured to 4000 p.s.i.g. The temperature was adjusted to 80° C., and after several hours of reaction time the autoclave was cooled, vented and opened in the nitrogen box.

EXAMPLE IV

The procedure, equipment, reactants and reaction conditions of Example III were utilized except that vanadium tetrachloride was substituted for titanium isopropoxide as a reaction promoter.

EXAMPLE V

The procedure, equipment, reactants and reaction conditions of Example III were again utilized except that triethylaluminum and titanium isopropoxide were not added to the system and the aluminum metal was activated before being reacted. Essentially no aluminum product was formed.

Example V illustrates the fact that in the absence of titanium (or other catalytic element used pursuant to this invention), aluminum—even when in activated form—cannot be caused to react with a tertiary mono amine and hydrogen under practical reaction conditions.

EXAMPLE VI

The procedure of Example I was repeated using 9.5 grams of commercially-available aluminum (containing 1900 parts per million titanium), 55.5 milliliters of trimethylamine, 100 milliliters of benzene. System temperature was maintained at 70° C. during the reaction period of nine hours. All other reactant quantities and process conditions were as in Example I, with the exception that the baffle was removed in this run.

EXAMPLE VII

The procedure of Example I was repeated using 7 grams of the carbothermic aluminum alloy, 1 milliliter of titanium isopropoxide, 110 milliters of trimethylamine (as both the reactant and solvent) and maintaining the reaction temperature at 110° C. All other reactant quantities and process conditions were as in Example I, except that there was no benzene solvent present in the system and the baffle was eliminated in the stirring procedure.

EXAMPLE VIII

The procedure of Example I was repeated using the components therein with the following alterations: 5 milliliters of triethylaluminum, 2 grams of sodium hydride (instead of sodium used in Example I), 100 milliliters of benzene, and 55.5 milliliters of trimethylamine were used. The temperature was maintained at 70° C. with stirring (no baffle).

EXAMPLE IX

The procedure of Example I was repeated, using the same reactants in the same quantities, except that 7 grams of the carbothermic aluminum alloy was used and 50 milliliters of tetrahydrofuran was substituted for benzene as the reaction solvent.

EXAMPLE X

The procedure of Example I was repeated using 100 milliliters of diphenyl ether as a solvent, 3 milliliters of triethylaluminum as the sole activator, and conducting the reaction at 70° C. All other reactants were present in the same quantities as set forth in Example I.

As indicated in the foregoing examples, a variety of process conditions can be effectively employed in practicing the many features present in this invention. The reaction may take place with or without a solvent and in the presence of a variety of catalysts, which may be introduced into the system by various advantageous methods. Reaction conditions may vary widely and operating procedures are relatively simple.

In view of these and other features disclosed in the process, the invention makes a maximum contribution to the art in the novel method of synthesizing tertiary amine alane complex compounds.

What is claimed is:

1. A process for preparing tertiary amine alanes which comprises effecting reaction in an essentially anhydrous system among metallic aluminum, hydrogen, and a tertiary mono amine, selected from the group consisting of tertiary mono alkyl amines, tertiary mono aryl amines, tertiary mono aralkyl amines, or tertiary mono heterocyclic amines of the pyridine type, in the presence of a reaction promoting quantity of at least one element of Group IV-B or V-B.

2. The process of claim 1 wherein metallic titanium and metallic aluminum are introduced into said system in the form of an aluminum alloy containing at least about 40 percent by weight of aluminum and at least about 0.001 percent by weight of titanium based on the weight of the aluminum alloy.

3. The process of claim 1 wherein metallic titanium and metallic aluminum are introduced into said system in the form of an aluminum alloy containing from about 0.001 to about 10 percent by weight of titanium, from about 0.1 to about 10 percent by weight of iron, from about 5 to about 50 percent by weight of silicon, and at least 40 percent by weight of aluminum.

4. The process of claim 1 wherein titanium is introduced into said system as a titanium-containing compound( selected from the group consisting of titanium esters having from 1 to about 12 carbon atoms or titanium halides.

5. The process of claim 1 wherein vanadium is introduced into said system as a vanadium halide.

6. The process of claim 1 wherein said reaction is effected at a pressure within the range of from about 50 to about 15,000 p.s.i.g. and at a temperature within the range of about 50° C. to about 200° C. sufficient to result in the uptake of hydrogen and the formation of the tertiary amine alane.

7. The process of claim 1 wherein said system includes a relatively inert solvent in which the tertiary mono amine and the amine alane product are soluble.

8. The process of claim 1 wherein said system includes a small quantity of hydrocarbon aluminum compound sufficient to promote the reaction.

9. The process of claim 1 wherein said system includes:
(a) a relatively inert solvent in which the tertiary mono amine and the amine alane product are soluble, and
(b) a small quantity of hydrocarbon aluminum compound sufficient to promote the reaction.

10. The process of claim 1 wherein said system includes:
(a) a relatively inert solvent in which the tertiary mono amine and the amine alane product are soluble,
(b) a small quantity of hydrocarbon aluminum compound sufficient to promote the reaction, and
(c) a small quantity of an alkali metal or an alkali metal hydride sufficient to promote the reaction.

11. The process of claim 1 wherein:
(a) metallic titanium and metallic aluminum are introduced into said system in the form of an aluminum alloy containing from about 0.001 to about 10 percent by weight of titanium, from about 0.1 to about 10 percent by weight of iron, from about 5 to about 50 percent by weight of silicon, and at least about 40 percent by weight of aluminum, and
(b) said system includes a relatively inert solvent in which the tertiary mono amine and the amine alane product are soluble.

12. The process of claim 1 wherein:
(a) metallic titanium and metallic aluminum are introduced into said system in the form of an aluminum alloy containing from about 0.001 to about 10 percent by weight of titanium, from about 0.1 to about 10 percent by weight of iron, from about 5 to about 50 percent by weight of silicon, and at least about 40 percent by weight of aluminum, and
(b) said system includes a small quantity of hydrocarbon aluminum compound sufficient to promote the reaction.

13. The process of claim 1 wherein:
(a) metallic titanium and metallic aluminum are introduced into said system in the form of an aluminum alloy containing from about 0.001 to about 10 percent by weight of titanium, from about 0.1 to about 10 percent by weight of iron, from about 5 to 50 percent by weight of silicon, and at least about 40 percent by weight of aluminum, and
(b) said system includes
(1) a relatively inert solvent in which the tertiary mono amine and the amine alane product are soluble,
(2) a small quantity of hydrocarbon aluminum compound sufficient to promote the reaction, and
(3) a small quantity of an alkali metal or an alkali metal hydride sufficient to promote the reaction.

14. The process of claim 1 wherein said tertiary mono amine is a trialkyl amine.

15. The process of claim 1 wherein said tertiary mono amine is a heterocyclic amine of the pyridine type.

16. The process of claim 1 wherein said tertiary mono amine is trimethyl amine.

17. The process of claim 1 wherein said system includes a relatively inert solvent in which the tertiary mono amine and the amine alane product are soluble and wherein the solvent containing the dissolved amine alane product is separated from the solids present in the system.

References Cited
UNITED STATES PATENTS

| | | |
|---|---|---|
| 3,032,574 | 5/1962 | Ziegler et al. |
| 3,159,574 | 12/1964 | Ashby. |
| 3,344,079 | 9/1967 | Ashby. |
| 3,326,955 | 6/1967 | Brandel et al. |

TOBIAS E. LEVOW, Primary Examiner

H. M. S. SNEED, Assistant Examiner

U.S. Cl. X.R.

260—448 R